US011100750B2

(12) United States Patent
Oyama et al.

(10) Patent No.: US 11,100,750 B2
(45) Date of Patent: Aug. 24, 2021

(54) INFORMATION PROCESSOR

(71) Applicant: Universal Entertainment Corporation, Tokyo (JP)

(72) Inventors: Masaki Oyama, Tokyo (JP); Toshikazu Jinnouchi, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 0 days.

(21) Appl. No.: 16/503,855

(22) Filed: Jul. 5, 2019

(65) Prior Publication Data

US 2020/0013258 A1 Jan. 9, 2020

(30) Foreign Application Priority Data

Jul. 9, 2018 (JP) ............................ JP2018-129899

(51) Int. Cl.
*A63F 9/24* (2006.01)
*A63F 11/00* (2006.01)
*G06F 13/00* (2006.01)
*G06F 17/00* (2019.01)
*G07F 17/32* (2006.01)

(52) U.S. Cl.
CPC ...... *G07F 17/3213* (2013.01); *G07F 17/3209* (2013.01)

(58) Field of Classification Search
USPC ............................... 463/1, 5, 20, 22, 25, 30
See application file for complete search history.

(56) References Cited

U.S. PATENT DOCUMENTS

2008/0132322 A1* 6/2008 Yoshizawa .............. G07F 17/32 463/20
2009/0227345 A1* 9/2009 Yoshizawa .......... G07F 17/3267 463/20
2011/0201406 A1* 8/2011 Jaffe ....................... G07F 17/34 463/21
2014/0274282 A1* 9/2014 Mastropietro ...... G07F 17/3213 463/20

FOREIGN PATENT DOCUMENTS

JP 2016159003 A 9/2016

* cited by examiner

*Primary Examiner* — Adetokunbo O Torimiro
(74) *Attorney, Agent, or Firm* — Potomac Law Group, PLLC; Kenneth Fagin

(57) ABSTRACT

An information processor 1 includes: a storage unit 3 which stores reel strip display data formed of plural types of symbol images, long symbol display data which is sized to be in a game display area 21, and position determination data used for determining a location where superposition on a reel strip is performed; and a controller 10 configured to display and control symbols the controller 10 being configured to execute the processes of: determining symbol stop positions; determining whether to superpose the long symbol display data and display in the game display area 21; and when it is determined that the long symbol display data is superposed and displayed in the game display area, displaying a long symbol 20 entirely in the game display area 21.

4 Claims, 10 Drawing Sheets

FIG.3

| NO. | 1st SYMBOL | 2nd SYMBOL | 3rd SYMBOL | 4th SYMBOL | 5th SYMBOL |
|---|---|---|---|---|---|
| 0 | 1BAR | 1BAR | RED7 | 1BAR | 1BAR |
| 1 | BLANK | BLANK | BLANK | BLANK | BLANK |
| 2 | 2BAR | 2BAR | 3BAR | 2BAR | 3BAR |
| 3 | BLANK | BLANK | BLANK | BLANK | BLANK |
| 4 | RED7 | BLUE7 | RED7 | BLUE7 | RED7 |
| 5 | BLANK | BLANK | BLANK | BLANK | BLANK |
| 6 | RED7 | BONUS | BLUE7 | BONUS | RED7 |
| 7 | BLANK | BLANK | BLANK | BLANK | BLANK |
| 8 | 2BAR | 2BAR | 1BAR | 2BAR | 3BAR |
| 9 | BLANK | BLANK | BLANK | BLANK | BLANK |
| 10 | 1BAR | 3BAR | BONUS | 3BAR | 1BAR |
| 11 | BLANK | BLANK | BLANK | BLANK | BLANK |
| 12 | RED7 | RED7 | 1BAR | RED7 | RED7 |
| 13 | BLANK | BLANK | BLANK | BLANK | BLANK |
| 14 | BLUE7 | BLUE7 | 2BAR | BLUE7 | BLUE7 |
| 15 | BLANK | BLANK | BLANK | BLANK | BLANK |
| 16 | 3BAR | 1BAR | BLUE7 | 1BAR | 2BAR |
| 17 | BLANK | BLANK | BLANK | BLANK | BLANK |
| 18 | BLUE7 | BLUE7 | BLUE7 | BLUE7 | BLUE7 |
| 19 | BLANK | BLANK | BLANK | BLANK | BLANK |
| 20 | BLUE7 | BLUE7 | BLUE7 | BLUE7 | BLUE7 |
| 21 | BLANK | BLANK | BLANK | BLANK | BLANK |

FIG.5

| | 1st | 2nd | 3rd | 4th | 5th |
|---|---|---|---|---|---|
| NO. | SYMBOL | SYMBOL | SYMBOL | SYMBOL | SYMBOL |
| 0 | 1BAR | 1BAR | RED7 | 1BAR | 1BAR |
| 1 | BLANK |  | BLANK |  | BLANK |
| 2 | 2BAR | | 3BAR | | 3BAR |
| 3 | BLANK | | BLANK | | BLANK |
| 4 | RED7 | | RED7 | | RED7 |
| 5 | BLANK | BLANK | BLANK | BLANK | BLANK |
| 6 | RED7 | BONUS | BLUE7 | BONUS | RED7 |
| 7 | BLANK | BLANK | BLANK | BLANK | BLANK |
| 8 | 2BAR |  | 1BAR |  | 3BAR |
| 9 | BLANK | | BLANK | | BLANK |
| 10 | 1BAR | | BONUS | | 1BAR |
| 11 | BLANK | | BLANK | | BLANK |
| 12 | RED7 | RED7 | 1BAR | RED7 | RED7 |
| 13 | BLANK | BLANK | BLANK | BLANK | BLANK |
| 14 | BLUE7 | BLUE7 | 2BAR | BLUE7 | BLUE7 |
| 15 | BLANK |  | BLANK |  | BLANK |
| 16 | 3BAR | | BLUE7 | | 2BAR |
| 17 | BLANK | | BLANK | | BLANK |
| 18 | BLUE7 | | BLUE7 | | BLUE7 |
| 19 | BLANK | BLANK | BLANK | BLANK | BLANK |
| 20 | BLUE7 | BLUE7 | BLUE7 | BLUE7 | BLUE7 |
| 21 | BLANK | BLANK | BLANK | BLANK | BLANK |

INFORMATION PROCESSOR

CROSS-REFERENCE TO RELATED APPLICATION

This application claims the benefit of Japanese Patent Application No. 2018-129899 filed on Jul. 9, 2018, the contents of which are incorporated by reference.

BACKGROUND OF THE INVENTION

1. Field of the Invention

The present invention relates to an information processor.

2. Description of Related Art

Patent Literature 1 (Japanese Laid-Open Patent Publication No. 2016-159003) recites a method of controlling reels, in which the number of long symbols to be displayed is determined based on a random determination table which is used for determining the number of long symbols displayed in a display area.

BRIEF SUMMARY OF THE INVENTION

In the method of controlling the reels recited in Patent Literature 1, however, a long symbol provided across plural successive symbol areas may be only partially displayed in the display area. Such a long symbol lacks impact on players. Furthermore, when plural types of reel strips on which long symbols are provided at various parts are prepared, a large memory capacity is required.

An object of the present invention is therefore to provide an information processor which is free from the problems above.

An information processor of the present invention includes a storage unit and a controller, the storage unit storing: reel strip display data used for displaying a reel strip formed of plural types of symbol images on a game display area of a terminal; long symbol display data used for displaying a long symbol superposed on the reel strip, the long symbol being as long as a plurality of the symbol images and being sized to be in the game display area; and position determination data used for randomly determining a location where the long symbol is superposed on the reel strip so that the long symbol displayed based on the long symbol display data is entirely displayed in the game display area, in a layout of symbols which have been selected to be provided at symbol stop positions, when it is determined that the long symbol is displayed in the game display area, and the controller being configured to execute the processes of: determining the symbol stop positions for performing stop-display in the game display area; determining whether to superpose the long symbol on the reel strip and display the long symbol in the game display area; and when it is determined that the long symbol is superposed on the reel strip and is displayed in the game display area, displaying the long symbol entirely in the game display area by using the position determination data.

In the information processor of the present invention, when it is determined that a long symbol is superposed on a reel strip and displayed in the game display area, a process is executed by using the position determination data to display the entirety of the long symbol in the game display area. With this arrangement, the required memory capacity is small as compared to cases where a reel strip with a long symbol is additionally provided. Furthermore, because the long symbol is not partially but entirely displayed, the long symbol has an impact on the player.

The information processor of the present invention is preferably arranged such that the position determination data is further used to determine a location where another long symbol is superposed on the reel strip so that at least one symbol area is sandwiched between the another long symbol and the long symbol which has been determined to be displayed in the game display area.

Because plural long symbols are provided on one reel strip in the present invention, it is possible to raise the expectations on the stop of a long symbol in the game display area.

According to the present invention, the required memory capacity is small as compared to cases where a reel strip with a long symbol is additionally provided. Furthermore, because the long symbol is not partially but entirely displayed, the long symbol has an impact on the player.

BRIEF DESCRIPTION OF THE DRAWINGS

Other and further objects, features and advantages of the invention will appear more fully from the following description taken in connection with the accompanying drawings in which:

FIG. 3 shows an example of reel strips.

FIG. 5 shows a state in which long symbols are superposed on reel strips.

DETAILED DESCRIPTION OF THE PREFERRED EMBODIMENT

An information processor of the present invention will be described with reference to figures.

Information Processor: Outline

A slot game is playable on an information processor 1 (terminal of the present invention) which is a computer. In the slot game, slot game symbols on video reels are stoppable and displayable in a game display area 21 which is displayed on a display 2 shown in FIG. 1. The slot game symbols are provided to form a symbol matrix of 4 rows and 5 columns. The symbol matrix provided in the game display area 21 is not limited to this, and the symbol matrix may be formed of 3 rows and 3 columns, for example.

Figure 2:
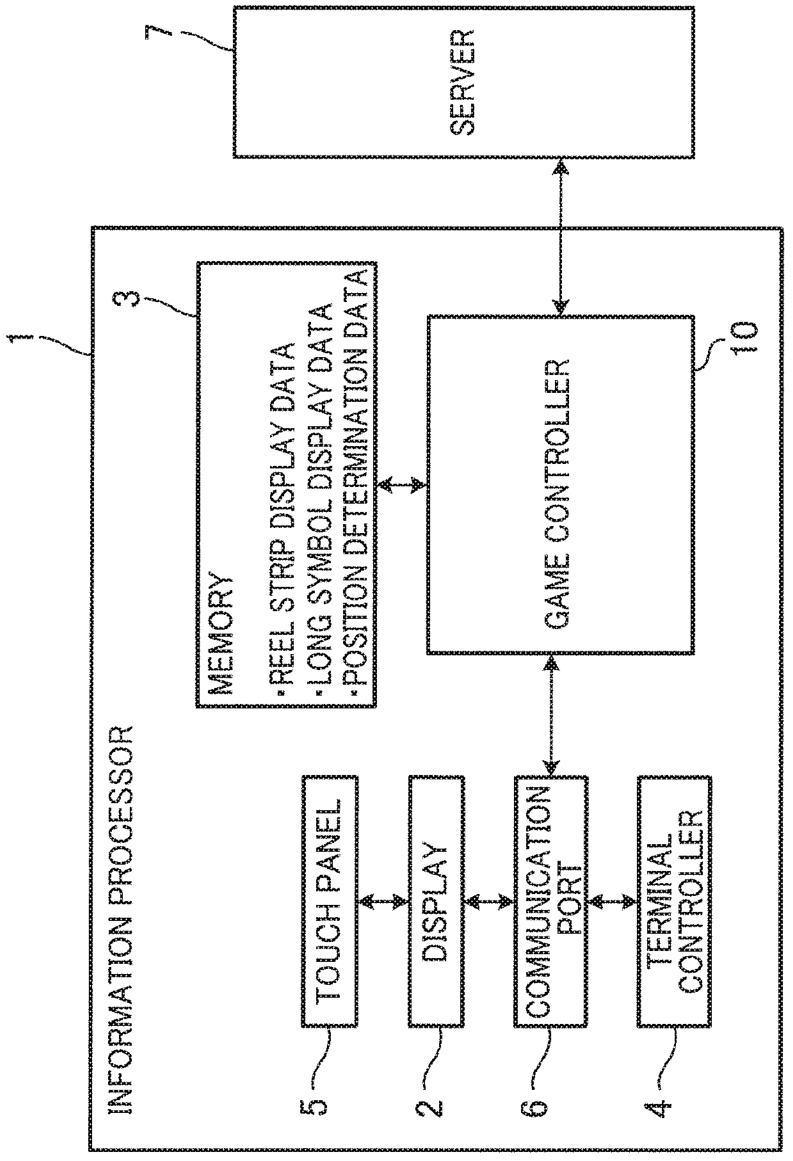
FIG. 2 illustrates the electric configuration of the information processor shown in FIG. 1.

As shown in FIG. 2, the information processor 1 includes a touch panel 5 which is an input device, a display 2, a communication port 6, a terminal controller 4, a game controller 10 (controller of the present invention), and a memory 3 (storage unit of the present invention). The information processor 1 may be a mobile device or a desktop device. Examples of the mobile information processor 1 include mobile information devices such as a portable computer, a laptop computer, a note PC, a tablet PC, a handheld PC, a PDA (Personal Data Assistant), and a smartphone. Examples of the desktop information processor 1 include a desktop PC and a gaming machine.

In the present embodiment, the information processor 1 includes the terminal controller 4 and the game controller 10 and these controllers 4 and 10 execute processes in cooperation with each other. Alternatively, all processes may be executed by the game controller 10.

The touch panel 5 is an input device by which operations for the game are performed. The touch panel 5 is entirely provided on the display 2 and receives inputs from a game player. The touch panel 5 receives, for example, an operation to log in the game by a game player, an operation to start the rotation (spin) of video reels, etc.

In the present embodiment, the touch panel 5 functions as an input device, and receives a swipe input, a touch input, and the like; however, the present embodiment is not limited to this. For example, a microphone or a camera may be adopted as an input device, and may receive voice or gesture of the game player.

The display 2 is configured to display a game screen in response to an input to the touch panel 5. The display method of the display 2 is, for example, liquid crystal, organic electroluminescence, CRT (Cathode Ray Tube), or plasma.

The communication port 6 is connected to the game controller 10 and exchanges data with the game controller 10. The communication port 6 is a two-way communication path such as the Internet and cable television.

The terminal controller 4 is connected to the touch panel 5, the display 2, and the communication port 6 to control at least part of the game. The terminal controller 4 is connected to the server 7 via the communication port 6 to be able to communicate with the server 7. The game is run by the terminal controller 4 such that one turn of the game program is downloaded from the server 7 by the terminal controller 4. Alternatively, the game may be run such that the server 7 and the terminal controller 4 continuously communicate with each other.

The game controller 10 controls the game displayed on the display 2 in cooperation with the terminal controller 4, while sending and receiving game data through the communication port 6. The game controller 10 is connected to the memory 3. The memory 3 stores a program executed by the game controller 10. The data and program in the memory 3 may be stored in advance at the stage of factory shipment, or may be downloaded from the server 7 or the like via communication means and stored.

The memory 3 of the present embodiment stores reel strip display data, long symbol display data, and position determination data.

The reel strip display data is used for displaying, in the game display area 21 of the terminal 1, reel strips each of which is formed of plural types of symbol images (see FIG. 3). On the reel strips shown in FIG. 3, plural types of symbol images are provided on each of the first reel to the fifth reel. The random determination probability of a stop position on a reel strip is associated with each symbol image. The random determination probability of the stop position determines the probability that each of the symbols on the first reel to the fifth reel is stop-displayed in an upper stage of the game display area 21. According to the reel strip display data, one symbol image is provided in one symbol area, and a later-described long symbol is not provided. While the reel strip display data of the present embodiment specifies the probability that a symbol appears in the upper stage of the game display area 21, the data may specify the probability that a symbol appears in a middle stage or a lower stage of the game display area 21.

Figure 4:
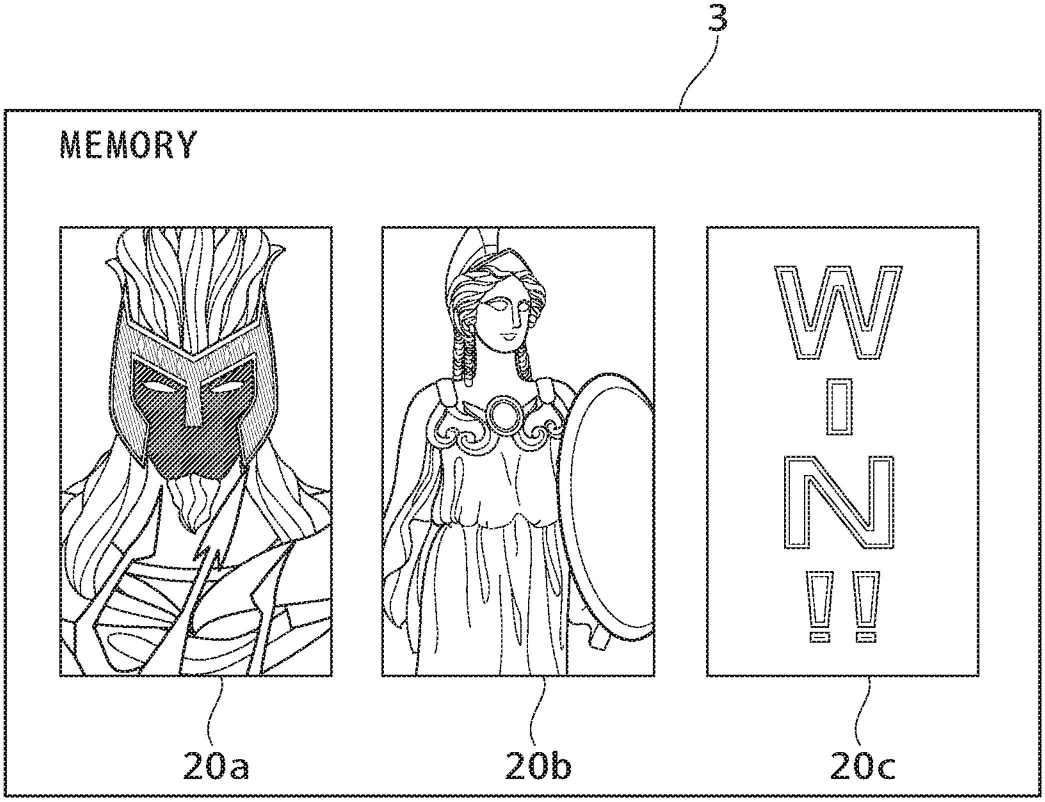
FIG. 4 shows an example of long symbols.

The long symbol display data is used for displaying a long symbol 20 which is superposed on a reel strip (see FIG. 4). Each long symbol 20 (20*a*, 20*b*, 20*c*) is as long as plural symbol images and is sized to be in the game display area 21. The phrase "superposed on" indicates that plural symbol images successively displayed on a reel strip are replaced with a long symbol 20. In the present embodiment, a symbol matrix of 4 rows and 5 columns is displayed in the game display area 21. Each long symbol 20 is a symbol formed across 4 rows (4 symbol areas) in the longitudinal direction of the reel strip.

Each long symbol is not limited to a character face as indicated by the reference symbol 20*a*. Each long symbol may be, for example, a long symbol which is the whole image of a character as indicated by the reference symbol 20*b*, a long symbol formed of texts as indicated by the reference symbol 20*c*, or another type. Each long symbol is formed across four symbol areas in the present embodiment. Alternatively, a long symbol may be formed across two or three successive symbol areas on condition that the entirety of the long symbol is displayed in the game display area 21.

The position determination data is used when it is determined that a long symbol 20 is displayed in the game display area 21. The position determination data is used for randomly determining a location where a long symbol 20 is superposed on a reel strip so that the long symbol 20 displayed based on the long symbol display data is entirely displayed in the game display area 21, in a layout of symbols which have been selected to be provided at symbol stop positions. In the present embodiment, when it is determined that "BLANK" with the code number NO.1 is stop-displayed in the upper stage of the game display area 21 from the first reel to the fifth reel and long symbols are displayed in the second reel and the fourth reel, the game controller 10 superposes the long symbol 20 on the NO.1 to NO.4 symbol areas of each of the second reel and the fourth reel, based on the position determination data (see FIG. 5).

In addition to the above, the position determination data is used for determining a position where a long symbol which is identical with a long symbol having been selected to be stop-displayed in the game display area 21 is superposed on a reel strip so that at least one symbol area is interposed between these long symbols. The "long symbol provided on a reel strip so that at least one symbol area is interposed between these long symbols" is identical in appearance with the "long symbol having been selected to be stop-displayed in the game display area 21" but is superposed on different symbol areas on the same reel strip. The "different symbol areas on the same reel strip" are symbol areas different from the symbol areas on which the long symbol 20 having been selected to be stop-displayed in the game display area 21 is superposed. In the present embodiment, the "different symbol areas on the same reel strip" are symbol areas which are not NO.1 to NO.4 symbol areas on the second and fourth reels (i.e., symbol areas other than the NO.1 to NO.4 symbol areas on the second and fourth reels). To be more specific, as shown in FIG. 5, based on the position determination data, the game controller 10 superposes a long symbol 20 on the NO.8 to NO.11 symbol areas on the second reel and the fourth reel and superposes a long symbol 20 on the NO.15 to NO.18 symbol areas on the second reel and the fourth reel.

In accordance with a game program stored in the memory 3, the game controller 10 executes the following processes. In other words, a game program and a game control method of the information processor 1 execute the following processes. To put it differently, the game program stored in the memory 3 causes the information processor 1 to execute the following processes. To be more specific, the game controller 10 executes processes of: determining symbol stop positions where symbols are stop-displayed in the game display area 21; determining whether to superpose a long symbol on a reel strip and display the long symbol in the game display area 21; and displaying the entirety of the long symbol in the game display area 21 by using the position determination data when it is determined that the long symbol is superposed on the reel strip and displayed in the game display area 21.

The game controller 10 is connected to the server 7 which causes the information processor 1 to run the game. The game controller 10 and the server 7 are connected wireless or by wires.

Information Processor 1: Specific Example: Slot Game

The information processor 1 having the electric configuration described above is a gaming machine on which the slot game is run.

Figure 1:
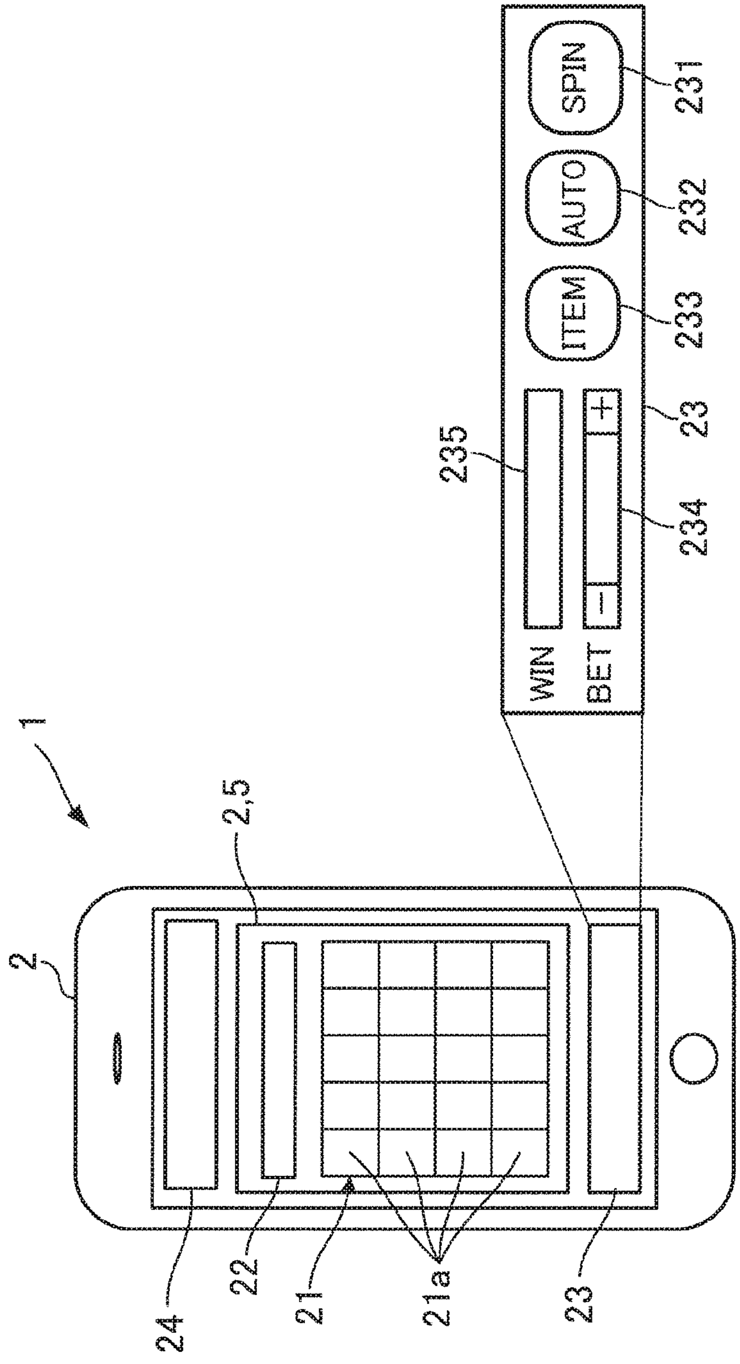
FIG. 1 illustrates the outline of an information processor of one embodiment of the present invention.

As shown in FIG. 1, the information processor 1 which is a gaming machine running the slot game displays a slot game screen on the display 2. The slot game screen includes a game display area 21 where symbol display areas 21*a* are displayed to form 4 rows and 5 columns, an effect area 22 where moving images and still images such as game characters are displayed in accordance with the slot game, an operation area 23 which is operated by the player to progress the game, and a game information display area 24 which displays game contents and game information. The operation area 23 includes a spin button 231, an AUTO button 232, an ITEM button 233, a bet button 234, and a WIN display portion 235, which are images.

On the entire surface of the display 2, a touch panel 5 which allows the game screen to be viewable from the outside is provided. The touch panel 5 makes it possible to detect the coordinates of a part touched by a player's finger or the like. With this arrangement, for example, the slot game (unit game) is executed once as the image of the spin button 231 is pressed. Furthermore, the slot game is serially executed plural times as the image of the AUTO button 232 is pressed.

Information Processor 1: Specific Example: Slot Game: Definitions

The base game in the slot game of the present embodiment is a game in which plural symbols are displayed (arranged) by being varied and stopped in the game display area 21, and includes a normal game. A state in which a symbol is displayed after being varied and stopped in the game display area 21 is termed "stop-display". As a bonus game, the free game is executed at least once in the slot game. The slot game may include a process of executing a free game where symbols are stop-displayed on condition that the payout rate is higher than the payout rate in the normal game and a bonus payout is awarded in accordance with the stop-displayed symbols.

A gaming value which is awarded when a prize is established as a result of a game result is a coin, paper money, or electrically valuable information corresponding to these. Note that the gaming value in the present invention is not particularly limited. Examples of the gaming value include game media such as medals, tokens, electronic money, tickets, and the like. A ticket is not particularly limited, and a barcoded ticket may be adopted for example. Alternatively, the gaming value may be a game point not including valuable information.

The free game is a game which is executable with a fewer amount of gaming values bet than in the normal game. Note that "bet of fewer amounts of gaming values" encompasses a bet of zero gaming value. The "free game" therefore may be a game runnable without a bet of a gaming value, which free game awards a gaming value amount based on stop-displayed symbols. In other words, the "free game" may be a game which is started without consumption of a gaming value. To the contrary, the "normal game" is a game runnable on condition that a gaming value is bet, which normal game awards a gaming value amount based on the stop-displayed symbols. In other words, the "normal game" is a game which starts with consumption of a gaming value.

The "unit game" is a series of operations from the start of the receiving of a bet to a state in which an award can be established. To put it differently, the unit game includes a single bet time for receiving a bet, a single game time of stop-displaying stopped symbols, and a single payout time of a payout process of awarding a payout.

A state in which symbols are displayed after being varied and stopped in the game display area 21 is termed "stop-display". To put it differently, the term "stop-display" indicates that the symbols are rearranged after the arrangement of the symbols is dismissed. The term "display" indicates a state in which the symbols are visually recognizable by an external player.

Information Processor 1: Specific Example: Functional Blocks

Figure 6:
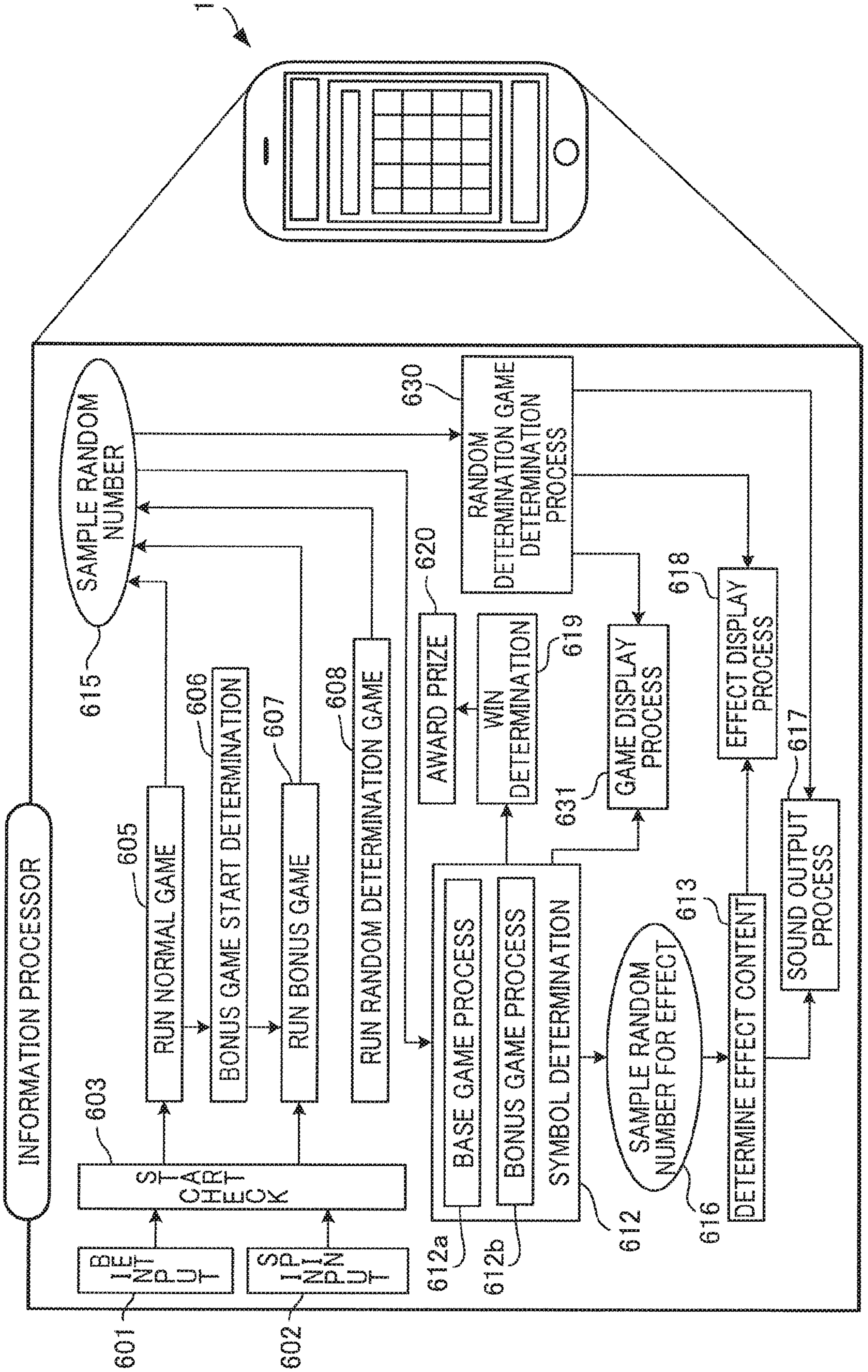
FIG. 6 is a functional block diagram of the information processor shown in FIG. 1.

As shown in FIG. 6, the information processor 1 which is a gaming machine running the slot game has the following functions. To be more specific, the information processor 1 includes a BET input unit 601 and a spin input unit 602. The BET input unit 601 and the spin input unit 602 are kinds of input devices. The BET input unit 601 has a function of receiving a bet in response to a player's operation. The spin input unit 602 has a function of receiving a player's operation, i.e., a start instruction to start a game.

The information processor 1 includes a start check unit 603, a normal game running unit 605, a bonus game start determining unit 606, a bonus game running unit 607, a random determination game running unit 608, a random number sampling unit 615, a symbol determining unit 612, an effect-use random number sampling unit 616, an effect determining unit 613, a sound output unit 617, an effect display processing unit 618, a winning determining unit 619, a prize awarding unit 620, a random determination game determination processing unit 630, and a winning determination method determining unit 631.

The normal game running unit 605 has a function of running a normal game which is a base game, on condition that the BET input unit 601 is operated. The bonus game start determining unit 606 determines whether to run a bonus game, based on a combination of stop-displayed symbols resulted from the normal game. In other words, the bonus game start determining unit 606 has functions of: determining that the player is entitled to a bonus game when a bonus symbol is stop-displayed; and activating the bonus game running unit 607 so as to run a bonus game from the subsequent unit game. The random determination game running unit 608 has a function of randomly determining prizes including the bonus game. As this function is executed after the execution by the bonus game running unit 607, the bonus game can be repeatedly run.

The symbol determining unit 612 includes a base game processing unit 612*a* and a bonus game processing unit 612*b*. The symbol determining unit 612 including these processing units 612*a* and 612*b* has functions of: determining symbols to be stop-displayed based on a random number given from the random number sampling unit 615; stop-displaying the determined symbols in the display 2; outputting stop-display information of the symbols to the winning determining unit 619; and outputting an effect instruction signal to the effect-use random number sampling unit 616, based on the combination of the stop-displayed symbols.

The effect-use random number sampling unit 616 has functions of: when receiving the effect instruction signal from the symbol determining unit 612, extracting an effect-use random number; and outputting the effect-use random number to the effect determining unit 613. The effect content determining unit 613 has functions of: determining an effect content by using the effect-use random number; outputting image information of the determined effect content to the effect display processing unit 618; and outputting audio and illumination information of the determined effect content to the sound output unit 617.

The winning determining unit 619 has functions of: determining whether a winning is achieved based on a combination of symbols when stop-display information of the symbols is given; calculating an amount of payout based on a winning combination formed when it is determined that a winning has been achieved; and outputting, to the prize awarding unit 620, a payout signal which is based on the payout amount. The prize awarding unit 620 has a function of paying out a gaming value to the player.

The random determination game determination processing unit 630 has a function of running a random determination game of awarding prizes including the bonus game based on a random number obtained by random number determination after the end of the bonus game, and outputs effect data of the random determination game to the game display processing unit 631, the effect display processing unit 618, and the sound output unit 617.

Information Processor 1: Specific Example: Game Contents

Figure 7:
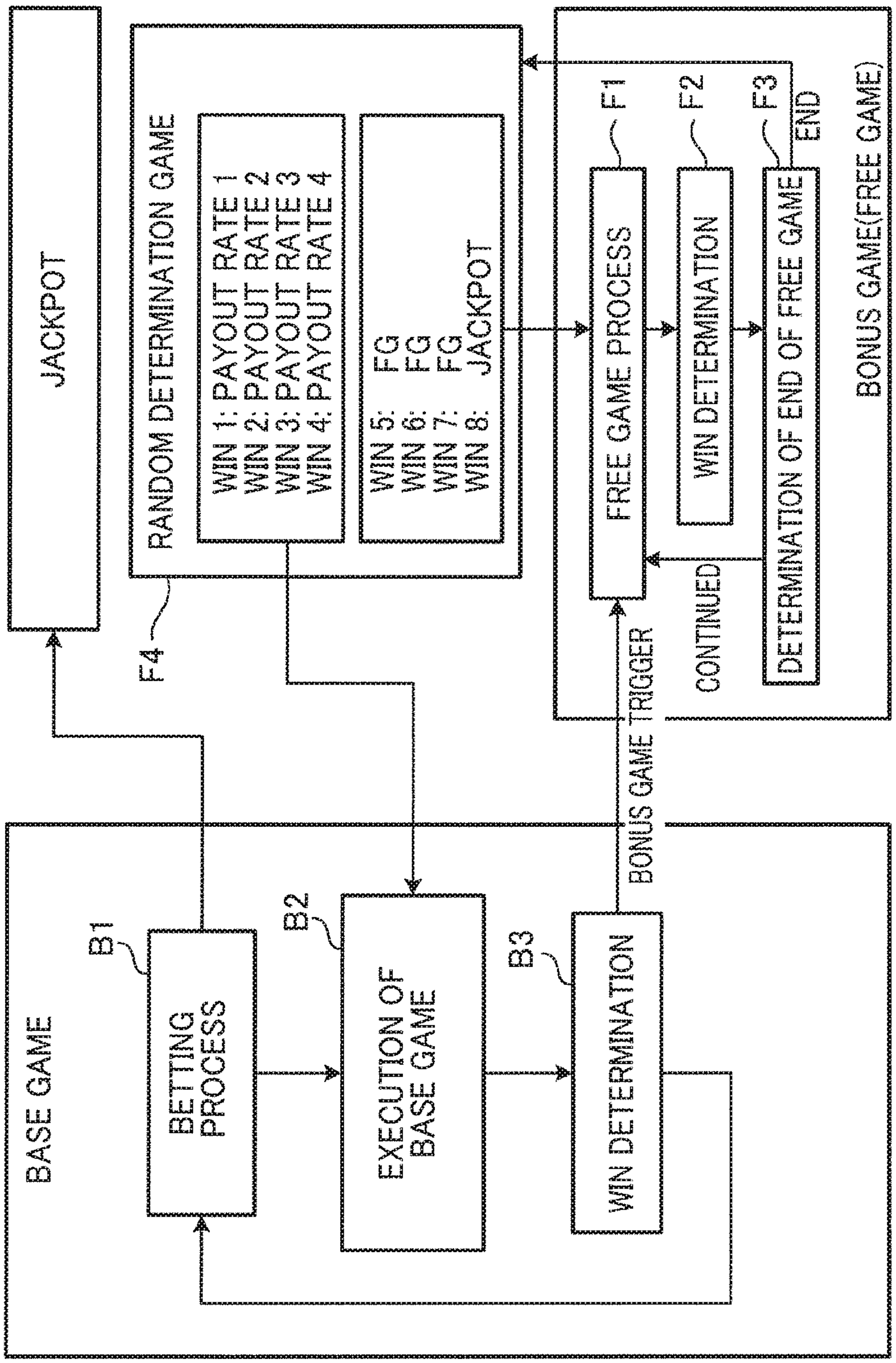
FIG. 7 illustrates game contents.

FIG. 7 shows the shift of the state in the information processor 1 which is a gaming machine. To be more specific, the figure shows the shift between a base game mode, a bonus game mode (free game), and a random determination game mode. The base game mode is a game state during the normal game, whereas the bonus game mode is equivalent to a game state in the free game.

The information processor 1 has three game modes, namely the base game mode, the bonus game mode, and the random determination game mode. The information processor 1 shifts to the bonus game mode when the unit game is run in the base game mode and a bonus trigger condition is satisfied in the base game mode. The trigger of the bonus game in the present embodiment is a condition in which long symbols appear (are stop-displayed) on two or more reel strips. The trigger of the bonus game may be another condition.

Information Processor 1: Specific Example: Game Contents: Base Game Mode

The base game mode is specifically described. In the game display area 21 displayed on the display 2 shown in FIG. 1, symbols for the slot game are stop-displayable on the video reels with 4 rows and 5 columns. In a betting process (B1), a bet amount is selected by the player. The bet amount is, for example, selected from numbers such as 1, 2, 3, 5, and 10 by operating the bet button 234. The resource generated by accumulating parts of bet amounts is termed jackpot.

Figure 8:
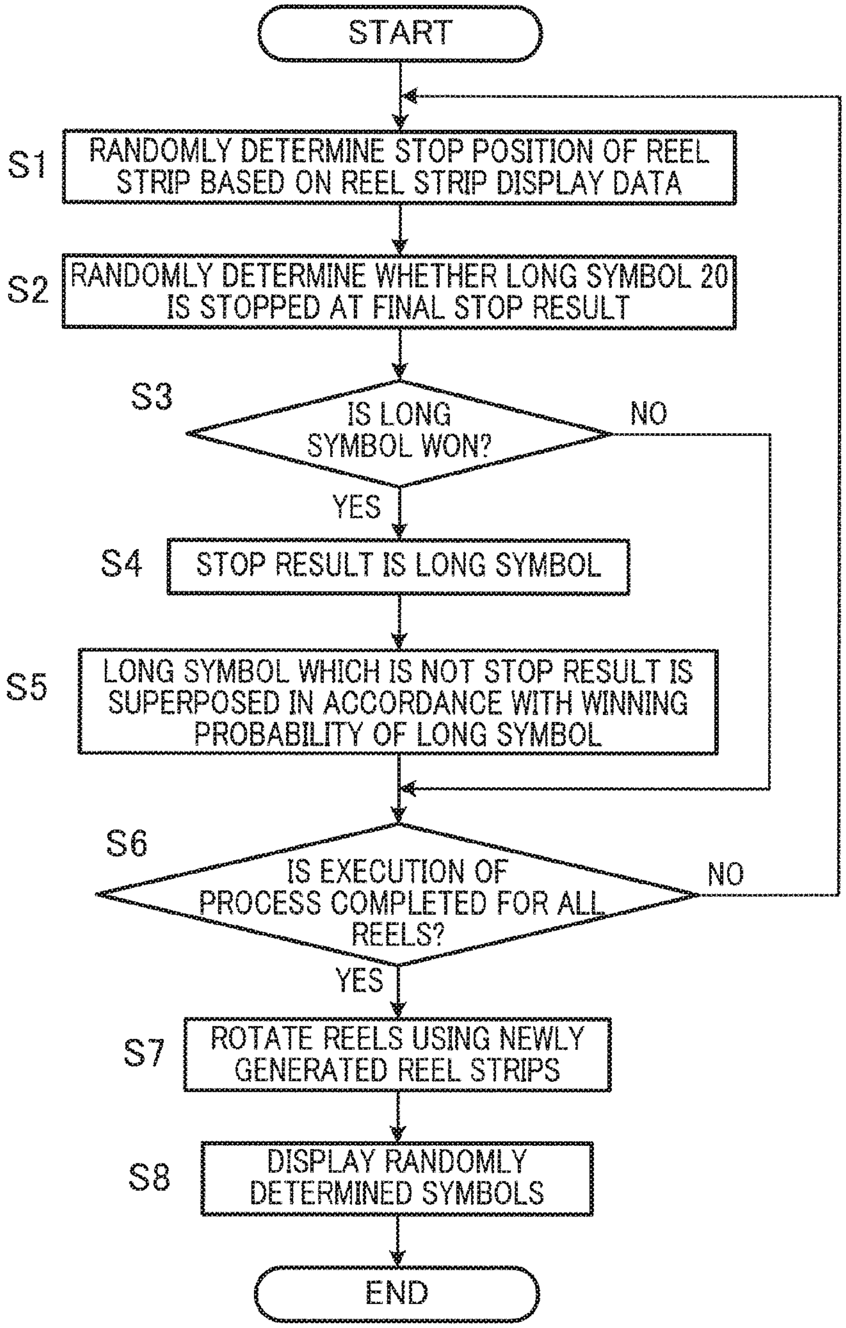
FIG. 8 is a flowchart of a routine of providing a long symbol in a game display area.

Thereafter, as the symbols are stop-displayed by varying (scroll-moving) and stopping (scroll-stop) the video reels, whether winning is achieved is determined. This will be specifically explained below with reference to the flowchart shown in FIG. 8. When the player presses the image of the spin button 231, in the step S1, the game controller 10 randomly determines the stop position of a reel strip based on the reel strip display data. As a result of this, symbols to be stop-displayed in the upper stage of the game display area 21 are randomly determined. In the present embodiment, it is determined that "BLANK" with the code number NO.1 (see FIG. 3) is stop-displayed in the upper stage of the game display area 21. At this stage, the symbols with the code numbers NO.1 to NO.4 are to be stop-displayed in the game display area 21 from the first reel to the fifth reel.

In the step S2, the game controller 10 randomly determines whether on each reel a long symbol 20 is stop-displayed at the final stop result (game display area 21). A non-limiting example of the probability (winning probability) at which a long symbol 20 is stop-displayed on each reel is 5%, for example.

In the step S3, whether a long symbol 20 has been won in the step S2 is determined. The routine proceeds to the step S4 when a long symbol 20 is won, and the game controller determines that the stop result is the long symbol 20. The stop result indicates a symbol displayed in the game display area 21 after the reel strips are rotated and stopped. In the present embodiment, it is determined that a long symbol 20 is stop-displayed on each of the second reel and the fourth reel. In the step S4, to be more specific, the game controller 10 superposes the long symbol 20 which is determined to be stop-displayed in the step S3 on the reel strip, based on the position determination data. In the present embodiment, the long symbols 20 are superposed on the NO.1 and NO.4 symbol areas of the second reel and the fourth reel (see FIG. 5). When no long symbol 20 has been won in the step S3, the routine proceeds to the step S6.

In the step S5, a long symbol which is not the stop result is superposed on the reel strips in accordance with the winning probability of the long symbol 20. In the present embodiment, new reel strips are generated such that, on the second reel and the fourth reel, long symbols 20 are superposed on NO.8 to NO.11 symbol areas and long symbols 20 are superposed on NO.15 to NO.18 symbol areas. Alternatively, when the winning probability is lower than the winning probability (e.g., 5%) in the present embodiment, long symbols 20 may be superposed on only NO.11 to NO.14 symbol areas of the second reel and the fourth reel, for example.

In the step S6, whether the execution of the steps S1 to S5 have already been completed for all reels (first reel to fifth reel in the present embodiment) is determined. The routine proceeds to the step S7 if the execution of the steps have already been completed. The routine goes back to the step S1 if the execution of the steps has not been completed.

Figure 9:
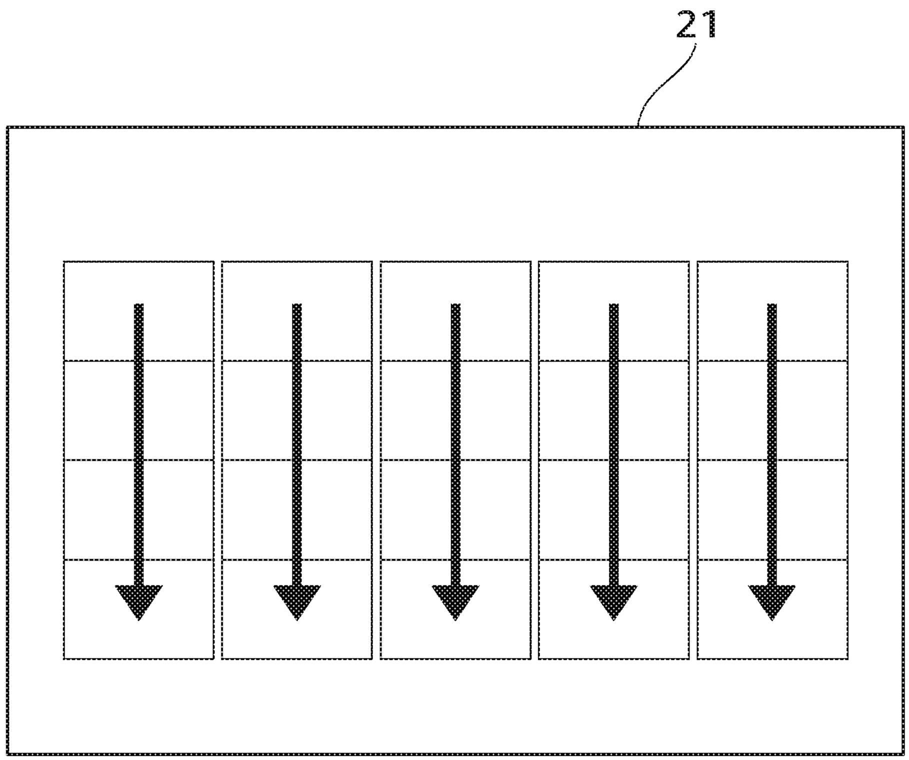
FIG. 9 shows a state in which the reel strips rotate in the game display area.

In the step S7, the game controller 10 rotationally displays reels in the game display area 21 by using new reel strips generated in the step S5 (see FIG. 9). In this regard, when it is determined in the step S3 that no long symbol 20 is to be provided on the reels, reel strips of FIG. 3 on which no long symbol 20 is superposed are rotationally displayed.

Figure 10:
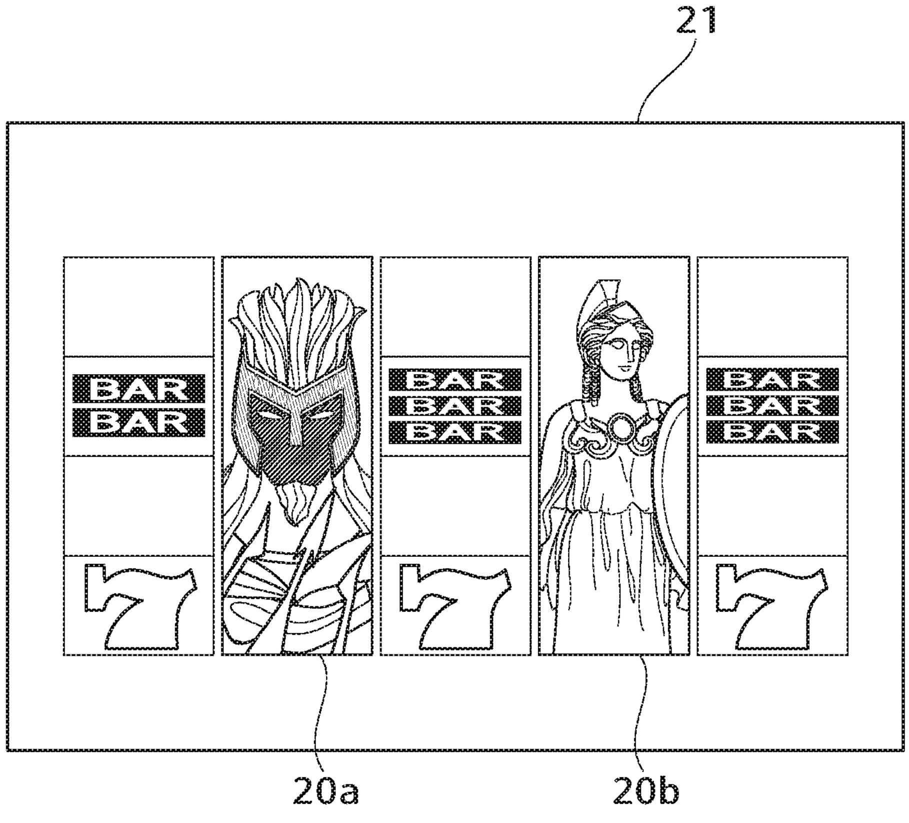
FIG. 10 shows a state in which symbol images are stop-displayed in the game display area.

In the final step S8, the game controller 10 stop-displays the symbols determined in the step S1 and the step S4 in the game display area 21 (see FIG. 10), and the routine is finished.

Then win determination is performed based on the stop-displayed symbols (B3). In the present embodiment, a bonus game trigger is established because the long symbols 20 are stop-displayed in the second reel and the fourth reel.

Characteristics of Information Processor of Present Embodiment

The information processor 1 of the present embodiment has the following characteristics.

In the information processor 1 of the present invention, when it is determined that a long symbol 20 is superposed on a reel strip and displayed in the game display area 21, a process is executed by using the position determination data to display the entirety of the long symbol 20 in the game display area 21. With this arrangement, the required memory capacity is small as compared to cases where a reel strip with a long symbol 20 is additionally provided. Furthermore, because the long symbol 20 is not partially but entirely displayed, the long symbol 20 has an impact on the player.

Because plural long symbols 20 are provided on one reel strip in the present invention, it is possible to raise the expectations on the stop of a long symbol 20 in the game display area 21.

Information Processor 1: Specific Example: Game Contents: Bonus Game Mode

The base game mode shifts to the bonus game mode when the trigger condition of the bonus game is established, and a free game process is executed, to begin with (F1).

In the free game process, free game reel strips used in the free game are determined, and a predetermined number of times of execution of the free game is set. The reel strips for the free game and the number of times of execution of the free game may be randomly chosen from plural selected options.

As the free game is run, win determination is executed (F2). This win determination may be identical with the win determination (B3) in the base game. For example, when long symbols are stop-displayed on two or more reel strips, a retrigger condition of the bonus game (free game) is established.

Thereafter, whether the execution of the free game ends is determined (F3). If the free game has not ended (i.e., continued), the free game is run for the remaining number of times in F1. When the execution of the free game has ended, the mode shifts to the random determination game (F4).

Information Processor 1: Specific Example: Game Contents: Random Determination Game Mode The random determination game is run such that a random determination game screen is displayed on the display 2. The random determination game screen includes an effect comment screen showing comments such as “Chance to Get Many Coins” and a first winning portion to an eighth winning portion, which are eight win display areas. When one of the first winning portion to the fourth winning portion is selected, the shift to the base game occurs.

The winning portions are associated with prizes including the bonus game. To be more specific, the first winning portion is associated with a prize awarding a payout calculated by multiplying the total payout of the bonus game (in which the free game is executed more than once) executed before the random determination game by one. The second winning portion is associated with a prize awarding a payout calculated by multiplying the above-described total payout by two. The third winning portion is associated with a prize awarding a payout calculated by multiplying the above-described total payout by three. The fourth winning portion is associated with a prize awarding a payout calculated by multiplying the above-described total payout by four. The fifth winning portion is associated with a prize of running a bonus game in which the free game is run five times. The sixth winning portion is associated with a prize of running a bonus game in which the free game is run 10 times. The seventh winning portion is associated with a prize of running a bonus game in which the free game is run 15 times. The eighth winning portion is associated with a prize of jackpot. This jackpot is a payout typically larger than payouts obtained based on combinations of stopped symbols in the base game, and includes a type (progressive jackpot) in which a payout results from accumulation of a part of each bet.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

While in the embodiment above long symbols are superposed on the second reel and the fourth reel, a long symbol may be superposed on any reel strip.

In the embodiment above, four rows of symbol areas are displayed in the game display area 21, and the entirety of a long symbol which is as large as four symbol areas is stop-displayed in the game display area 21. In this regard, effects similar to those in the embodiment above can be achieved when a long symbol which is as large as two or three symbol areas is stop-displayed in four rows of symbol areas displayed in the game display area 21.

Alternatively, three rows of symbol areas may be displayed in the game display area, and the entirety of a long symbol which is as large as three or two symbol areas may be stop-displayed in the game display area.

In the embodiment above, the terminal 1 is an information processor, and the terminal 1 includes the game controller 10. Alternatively, the server 7 is an information processor and the server 7 includes a server controller. In this case, the server controller is connected to a touch panel 5, a display 2, and a terminal controller 4 of the terminal via a communication port 6. The terminal sends an input signal which is input to the touch panel 5 by the player to the server controller via the communication port 6. The server controller sends a result of a process executed by a program described below to the terminal via the communication port 6, and displays the result on the display 2.

A recording medium in which a program executed by the controller of the information processor is stored causes the controller to execute the processes of:

(a) determining a symbol stop position for performing stop-display in the game display area of the terminal;

(b) determining whether to superpose a long symbol on a reel strip formed of plural types of symbol images and display the long symbol in the game display area (the long symbol is as long as plural symbol images and is sized to be in the game display area); and (c) when it is determined that the long symbol is superposed on the reel strip and displayed in the game display area, displaying the entirety of the long symbol in the game display area by using the position determination data (the position determination data is used for randomly determining a location where a long symbol is superposed on the reel strip so that the long symbol displayed based on the long symbol display data is entirely displayed in the game display area, in a layout of symbols which have been selected to be provided at symbol stop positions).

As a further modification, a method of controlling a system including a terminal and a server executes the above-described steps (a) to (c).

What is claimed is:

1. An information processor, comprising:

a storage unit, and a controller, the storage unit storing reel strip display data used for displaying a reel strip formed of plural types of symbol images each having a first length on a game display area of a terminal;

long symbol display data used for displaying a long symbol having a second length that is greater than the first length and that can be superposed on the reel strip, the long symbol 1) depicting subject matter that is different from the subject matter of all of the plural types of symbol images that have the first length and 2) being as long as a plurality of the symbol images that have the first length and being sized to be in the game display area; and position determination data used for randomly determining a location where the long symbol is to be superposed on the reel strip so that the long symbol displayed based on the long symbol display data is entirely displayed in the game display area, in a layout of symbols which have been selected to be provided at symbol stop positions, when it is determined that the long symbol is to be displayed in the game display area, the controller being configured to execute the processes of determining the symbol stop positions for performing stop-display in the game display area;

conducting a probability-based determination to determine whether to superpose the long symbol on the reel strip and display the long symbol in the game display area; and when it is determined that the long symbol is to be superposed on the reel strip and is to be displayed in the game display area, displaying the long symbol entirely in the game display area by using the position determination data.

2. The information processor according to claim 1, wherein the position determination data is further used to determine a location where another long symbol having the second length is to be superposed on the reel strip so that at least one symbol area is sandwiched between the another long symbol and the long symbol which has been determined to be displayed in the game display area, the another long symbol also depicting subject matter that is different from the subject matter of all of the plural types of symbol images that have the first length and that are displayed by the reel strip.

3. The information processor according to claim 1, wherein the long symbol is as long as the game display area and is displayed in its entirety in the game display area so as to be viewable.

4. The information processor according to claim 1, wherein a reel strip on which the long symbol is to be superposed is first rotationally displayed and then stop-displayed in the game display area.

* * * * *